(12) United States Patent
Zeng et al.

(10) Patent No.: US 11,475,707 B2
(45) Date of Patent: Oct. 18, 2022

(54) METHOD FOR EXTRACTING IMAGE OF FACE DETECTION AND DEVICE THEREOF

(71) Applicant: UBTECH ROBOTICS CORP LTD, Shenzhen (CN)

(72) Inventors: Yusheng Zeng, Shenzhen (CN); Jianxin Pang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 88 days.

(21) Appl. No.: 17/134,467

(22) Filed: Dec. 27, 2020

(65) Prior Publication Data

US 2021/0200990 A1 Jul. 1, 2021

(30) Foreign Application Priority Data

Dec. 26, 2019 (CN) .......... 201911370843.X (51) Int. Cl.
*G06V 40/16* (2022.01)
*G06T 7/00* (2017.01)

(52) U.S. Cl.
CPC .......... *G06V 40/165* (2022.01); *G06T 7/0002* (2013.01); *G06T 2207/10016* (2013.01); *G06T 2207/30168* (2013.01); *G06T 2207/30201* (2013.01)

(58) Field of Classification Search
CPC .. G06V 40/165; G06V 40/16; G06V 40/1347; G06T 7/0002; G06T 2207/10016; G06T 2207/30168; G06T 2207/30201; G06K 9/623
See application file for complete search history.

(56) References Cited

U.S. PATENT DOCUMENTS

2014/0176803 A1\* 6/2014 Luo .......... H04N 5/14
348/700

\* cited by examiner

*Primary Examiner* — Phuoc Tran (57) ABSTRACT

The present disclosure provides a method for extracting a face detection image, wherein the method includes: obtaining a plurality of image frames by an image detector, performing a face detection process on each image frame to extract a face area, performing a clarity analysis on the face area of each image frame to obtain a clarity degree of a face, conducting a posture analysis on the face area of each image frame to obtain a face posture angle, generating a comprehensive evaluation index for each image frame in accordance with the clarity degree of the face and the face posture angle of each image frame, and selecting a key frame from the image frames based on the comprehensive evaluation index. Such that the resource occupancy rate during image data processing may be reduced, and the quality of the face detection process may be improved.

20 Claims, 8 Drawing Sheets

METHOD FOR EXTRACTING IMAGE OF FACE DETECTION AND DEVICE THEREOF

CROSS REFERENCE TO RELATED APPLICATIONS

The present disclosure claims priority to Chinese Patent Application No. CN201911370843.X, filed Dec. 26, 2019, which is hereby incorporated by reference herein as if set forth in its entirety.

BACKGROUND

1. Technical Field

The present disclosure relates to face detection field, and particularly to a method for extracting a face detection image and a device thereof.

2. Description of Related Art

Face detection is a biometric technology of recognizing the identities of people based on human facial feature information. Comparing with other mature human biometric detection methods such as fingerprints and DNA detection, face detection is secretive, low-cost and highly interactive. Therefore, the face detection technology has been popular for many years.

The face detection adopts cameras, video cameras or other equipment to collect images or video streams containing human faces and analyze the video streams to obtain the facial data. However, each frame of the images in the video stream may be analyzed in the actual analysis process, which may cause excessive calculation of the device. Furthermore, if the image quality of the face from the video stream is poor, the image may easily be unrecognized or misrecognized.

BRIEF DESCRIPTION OF THE DRAWINGS

To describe the technical schemes in the embodiments of the present disclosure or in the prior art more clearly, the following briefly introduces the drawings required for the descriptions in the present disclosure. It should be understood that, the drawings in the following description merely show some embodiments of the present disclosure. For those skilled in the art, other drawings can be obtained according to the drawings without creative efforts.

DETAILED DESCRIPTION

The technical solutions in the embodiments of the present disclosure will be clearly and completely described below in conjunction with the drawings. Obviously, the described embodiments are only a part of the embodiments of the present disclosure, rather than all of the embodiments. Based on the embodiments in this disclosure, all other embodiments obtained by those ordinary skill in the art without creative work shall fall within the protection scope of this disclosure.

Figure 1:
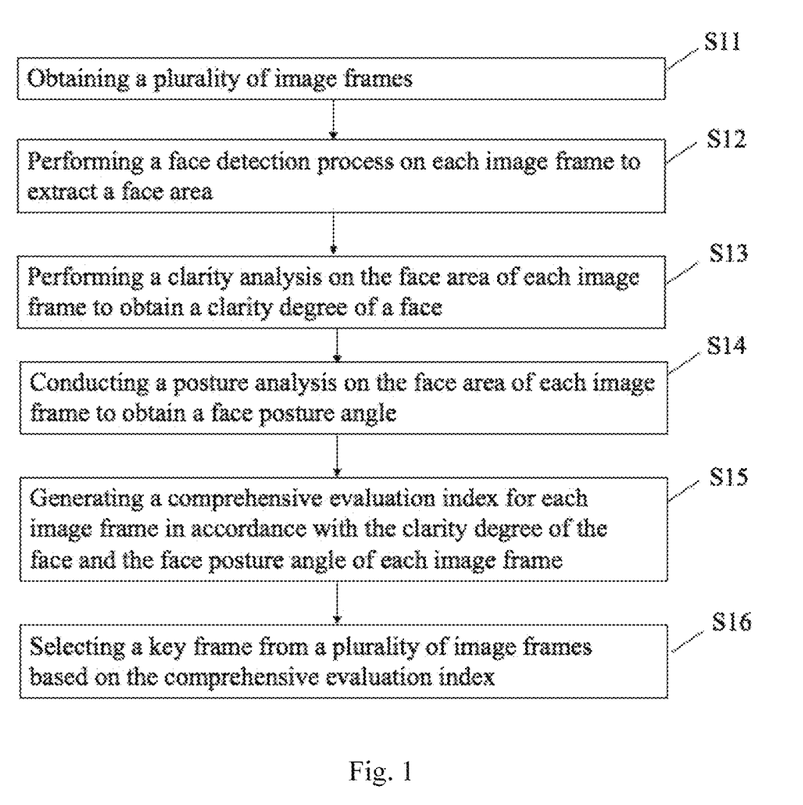
FIG. 1 is a schematic view of a method for extracting a face detection image in accordance with one embodiment of the present disclosure.

FIG. 1 is a schematic view of a method for extracting a face detection image in accordance with one embodiment of the present disclosure. The method includes the following steps.

Step S11: obtaining a plurality of image frames.

In one embodiment, the video stream may be captured by a camera installed on a terminal or by other predetermined equipment, thereby obtaining a plurality of image frames constituting the video stream. The image frames are obtained from the same video stream.

Step S12: performing a face detection process on each image frame to extract a face area.

The face detection process may be based on the five senses organs. For example, it may be based on the shape of the eyes, the nose, the mouth, or other organs, or may be based on the geometric relation between the organs or the distance between the organs, to determine the face area. In another example, the method may detect the face through a certain texture feature on the face, or it may also detect the face based on the skin color of the face.

In one example, the step of performing a face detection process on each image frame may further include the step of extracting the face area having a greatest size when determining a plurality of the face areas within the image frame.

Step S13: performing a clarity analysis on the face area of each image frame to obtain a clarity degree of a face.

Figure 2:
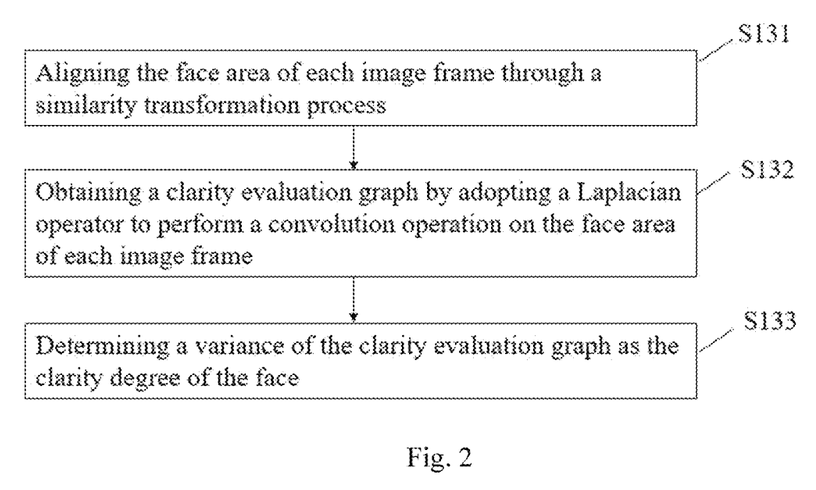
FIG. 2 is a flowchart of step S13 of a method for extracting a face detection image in accordance with one embodiment of the present disclosure.

The specific process of obtaining a clarity degree of a face is shown in FIG. 2, which specifically includes the following steps.

Step S131: aligning the face area of each image frame through a similarity transformation process.

Specifically, specific organ points in each face area, such as the left eye, the right eye, the nose tip, the left mouth corner and the right mouth corner of the face, may be configured as key points, so that after the similarity transformation process, each key point is mapped to a predetermined coordinate point of the predetermined coordinate plane.

After the similarity transformation process, the position and orientation of the face area of each image frame is changed, but the shape remains the same, such that the rigid is changed.

In one example, the coordinates of the five key points may be (38.2946, 51.6963), (73.5318, 51.5014), (56.0252, 71.7366), (41.5493, 92.3655), (70.7299, 92.2041).

Moreover, because the size of the face area extracted from each image frame may be the same or different, after aligning the face area of each image frame, the resolution of each image frame may also be unified. For example, the resolution may be 112*96.

Step S132: obtaining a clarity evaluation graph by adopting a Laplacian operator to perform a convolution operation on the face area of each image frame.

Because Laplacian is more sensitive to the noise, before using the Laplacian operator to perform the convolution operations on the image frames, a smoothing process and a filtering process may be conducted on the image frames to eliminate some of the noise. Further, a gray-scale process may also be conducted on the image frames after the smoothing process and the filter process. Specifically, the gray-scale process may include a component method, a maximum value method, an average method and a weighted average method.

The above Laplacian operator may be defined as $$\nabla^2 f(x, y) = \frac{\partial^2 f}{\partial x^2} + \frac{\partial^2 f}{\partial y^2}.$$

In order to make the Laplacian operator more suitable for digital image processing, the equation may be expressed in the discrete form of $\nabla^2$ f=[f(x+1, y)+f(x−1, y)+f(x, y+1)+f(x, y−1)]−4 f(x, y).

In one example, the above Laplacian operator may be expressed in the template form of $$\begin{bmatrix} 0 & 1 & 0 \\ 1 & -4 & 1 \\ 0 & 1 & 0 \end{bmatrix}.$$

It is understood that the convolution operation for each pixel of the image frame may be perform by calculating the product of the neighboring pixel of the pixel and the corresponding element of the Laplacian operator matrix, adding the product value of each pixel of the image frame as the value of the pixel position. The specific method of the convolution operation may include the following steps.

(1) Rotating the Laplacian operator for 180 degrees along a center.

(2) Sliding an operator and locating a center of the operator to a certain pixel of the face area of the image frame.

(3) Using a formula to sum up and obtain a pixel value of the face area of the image frame.

(4) Repeat (2) and (3) until all the pixel values of the face area of the image frames are calculated.

When calculating the edge of the image frame by the Laplacian operator, a portion of the operators may be located outside the edge of the image frame. In this case, a constant may be used to fill into the operator matrix area located outside the edge of the image frame. In one example, 0 may be used by default. Such that the edge of the clarity evaluation graph may be in black. In addition, the method of copying edge pixels may also be conducted for calculation.

After using the Laplacian operator to perform the convolution operation on the face area of the image frame, the corresponding clarity evaluation graph may be generated according to the calculated pixel value of each image frame, and the clarity evaluation graph corresponding to each image frame may be obtained.

Step S133: determining a variance of the clarity evaluation graph as the clarity degree of the face.

The variances of all pixel values of each clarity evaluation graph are calculated, and the variance is determined to be as the clarity of the face of each image frame, such that the blur degree of the corresponding image frame may be evaluated. If the variance of the clarity evaluation graph is lower than a predetermined threshold, it may be determined that the image frame corresponding to the clarity evaluation graph is blurred. If the variance of the clarity evaluation graph is higher than a predetermined threshold, it may be determined that the corresponding image frame is not blurred. The greater the variance, the sharper the texture and the higher the image clarity.

Step S14: conducting a posture analysis on the face area of each image frame to obtain a face posture angle.

Figure 3:
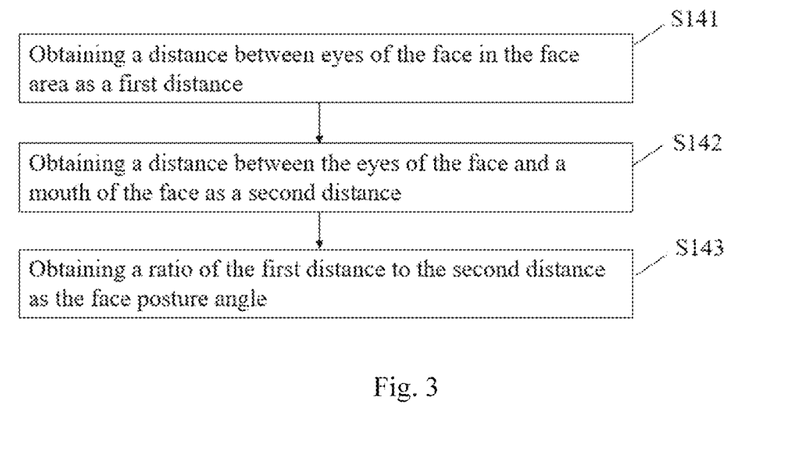
FIG. 3 is a flowchart of step S14 of a method for extracting a face detection image in accordance with one embodiment of the present disclosure.

The specific process of conducting a posture analysis on the face area is shown in FIG. 3, which specifically includes the following steps.

Step S141: obtaining a distance between eyes of the face in the face area as a first distance.

In one embodiment, the first distance is recorded as D1.

Step S142: obtaining a distance between the eyes of the face and a mouth of the face as a second distance.

In one embodiment, the second distance is recorded as D2.

Step S143: obtaining a ratio of the first distance to the second distance as the face posture angle.

It is understood that the first distance D1 is gradually decreasing when the face is rotated from the frontal face to the side face, while the second distance D2 is basically unchanged. Therefore, the ratio D1/D2 may be used as the angle of the face posture, that is, the front-side degree of the face, which is used to quantify the degree of the front-side of the face.

In one embodiment, the posture analysis based on the front-side degree of the face is conducted, the ratio distribution of the face at different angles in each image frame is obtained through experimental data. The ratio distribution is shown in the below table.

| Angle of Face a(°) | <10 | 10 < a < 30 | 30 < a < 60 | 60 < a < 90 |
|---|---|---|---|---|
| D1/D2 | 1.2-1.5 | 0.95-1.2 | 0.55-0.95 | <0.55 |

Figure 4:
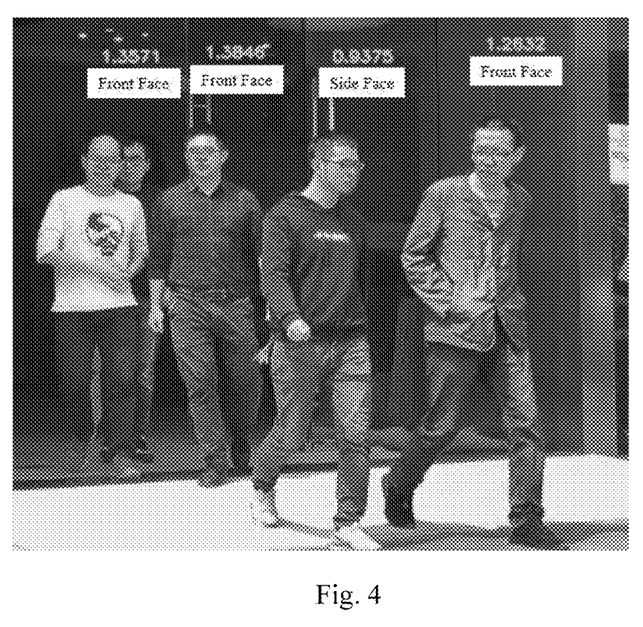
FIG. 4 is a figure of actual measurement results of a posture analysis based on a front-side degree of a face in accordance with one embodiment of the present disclosure.
Figure 5:
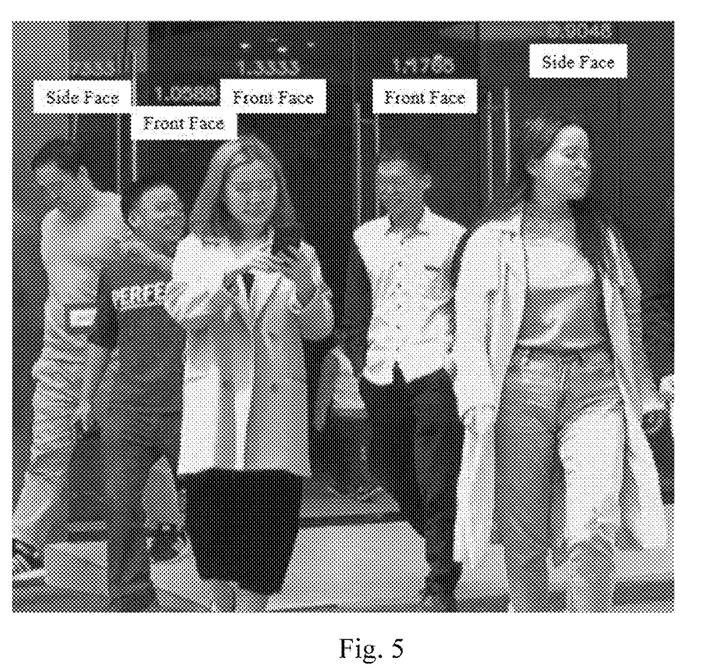
FIG. 5 is a figure of actual measurement results of a posture analysis based on a front-side degree of a face in accordance with one embodiment of the present disclosure.

The measured results of the posture analysis based on the face postures are shown in FIG. 4 and FIG. 5.

In actual application scenarios, 0.95 may be used as the threshold value of D1/D2, which may be the distinguishing threshold value between the front face and the side face. If the ratio of D1/D2 is greater than 0.95, it may be determined that the face in the image frame corresponding to D1 and D2 is a front face. If the ratio of D1/D2 is less than 0.95, it may be determined that the face in the image frame corresponding to D1 and D2 is a side face. In another example, the threshold value of D1/D2 may be set according to different races, facial shapes, and the like.

Step S15: generating a comprehensive evaluation index for each image frame in accordance with the clarity degree of the face and the face posture angle of each image frame.

Figure 6:
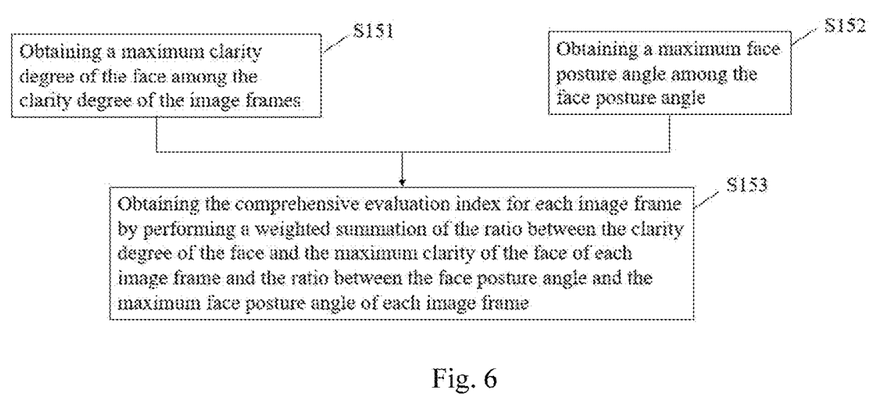
FIG. 6 is a flowchart of step S15 of a method for extracting a face detection image in accordance with one embodiment of the present disclosure.

The specific process of generating comprehensive evaluation index for each image frame is shown in FIG. 6, which may include the following steps.

Step S151: obtaining a maximum clarity degree of the face among the clarity degree of the image frames.

Each image frame in the same video stream is recorded in sequence as i-th frame, and the clarity degree of the face of each image frame is recorded as h. The maximum clarity degree of the face is obtained among the image frames and recorded as $b_{max}$. The greater the clarity degree of the face, the sharper the texture in the face area.

In one example, $b_{max}=\max(b_i)[i=1, 2 \ldots n]$, $0<i\leq n$.

Step S152: obtaining a maximum face posture angle among the face posture angle.

Each image frame in the same video stream is recorded as the i-th frame in sequence, and the corresponding face posture angle D1/D2 of each image frame is recorded as Pi. The face posture angle with the largest D1/D2 ratio, which indicates the maximum front-side degree of the face, is recorded as $p_{max}$. The greater the front-side degree of the face, the closer the face in the face area is to the front face.

In one example, $p_{max}=\max(P_i)[i=1, 2 \ldots n]$, $0<i\leq n$.

Step S153: obtaining the comprehensive evaluation index for each image frame by performing a weighted summation of the ratio between the clarity degree of the face and the maximum clarity of the face of each image frame and the ratio between the face posture angle and the maximum face posture angle of each image frame.

Specifically, the comprehensive evaluation index may be obtained by the following formula.

$H_i=\lambda_1*b_i/b_{max}+\lambda_2*p_ip_{max}$. wherein $H_i$ indicates the comprehensive evaluation index of the i-th frame image, and $\lambda_1$ and $\lambda_2$ are weighting coefficients.

Step S16: selecting a key frame from a plurality of image frames based on the comprehensive evaluation index.

The image frame with the largest comprehensive evaluation index may be selected as the key frame $H_{max}$ of the same video stream. In one example, $H_{max}=\max(H_i)[i=1, 2 \ldots n]$.

The value of the coefficient $\lambda_1$ and the coefficient $\lambda_2$ may be changed according to the actual demand. In one embodiment, the value of the coefficient $\lambda_1$ and the coefficient $\lambda_2$ may be 0.5. In another embodiment, the value of the coefficient $\lambda_1$ may be 0.7, and the value of coefficient $\lambda_2$ may be 0.3. In the actual application and calculation of the comprehensive evaluation index for each image frame, when the value of the coefficient $\lambda_1$ is 0.6, and the value of the coefficient $\lambda_2$ is 0.4, the key frame obtained from image frames may best meet expectation.

In some embodiments, after S16, the method may further include a step of registering the face in the key frame of the video stream.

The obtained key frame is the image with the highest comprehensive evaluation index in the entire video stream, and the key frame may be used for conducting a high-quality face registration. The face image information in the key frame is submitted to a face registration database to perform a comparing process or a registering process so as to avoid errors caused by a low-quality face registration.

Further, the time information and the location information of the key frame may be stored in the background registry.

Therefore, the method in present disclosure, which is different from the prior art, performs the clarity analysis and the posture analysis on the image frames in one video stream, and obtains the key frame according to the results of the two analyses. Such that the resource occupancy rate during image data processing may be reduced, and the quality of the face detection process may be improved.

Figure 7:
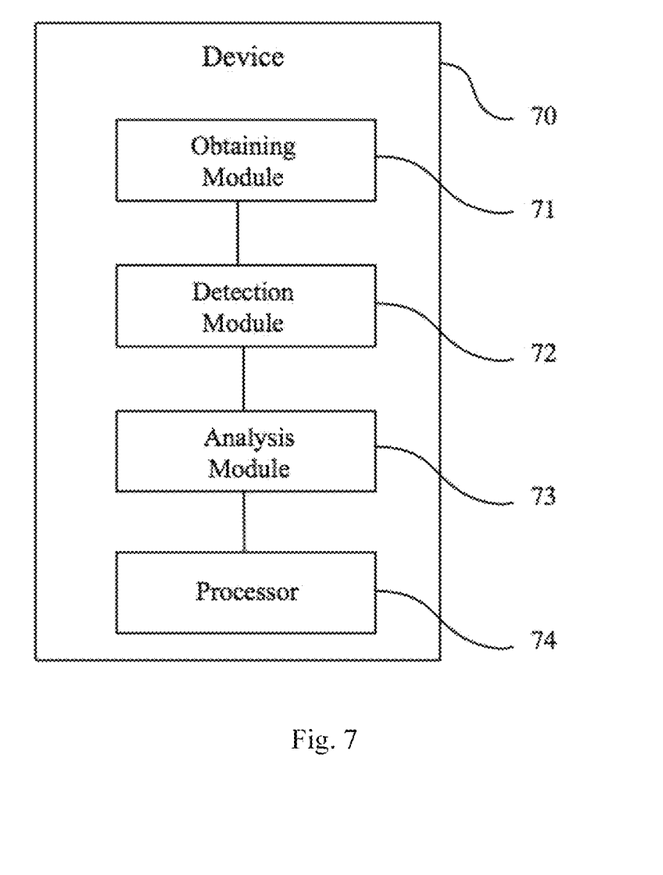
FIG. 7 is a schematic view of a device in accordance with one embodiment of the present disclosure.

FIG. 7 is a schematic view of a device in accordance with one embodiment of the present disclosure. The device 70 may include a obtaining module 71, a detection module 72, an analysis module 73 and a processor 74.

The obtaining module 71 is configured to obtain a plurality of image frames. The detection module 72 is configure to conduct the face detection process on each image frame to extract the face area. The analysis module 73 is configured to analyze the clarity degree of the face area of each image frame to obtain the clarity of the face, and to analyze the face area of each image frame to obtain face posture angle. The processor 74 is configured to generate a comprehensive evaluation index in accordance with the clarity degree of the face and the face posture angle of each image frame, and select the key frame from image frames based on the comprehensive evaluation index.

It should be noted that the method steps executed by the device 70 in this embodiment are based on the foregoing method embodiments, and the implementation principles and steps are similar.

Figure 8:
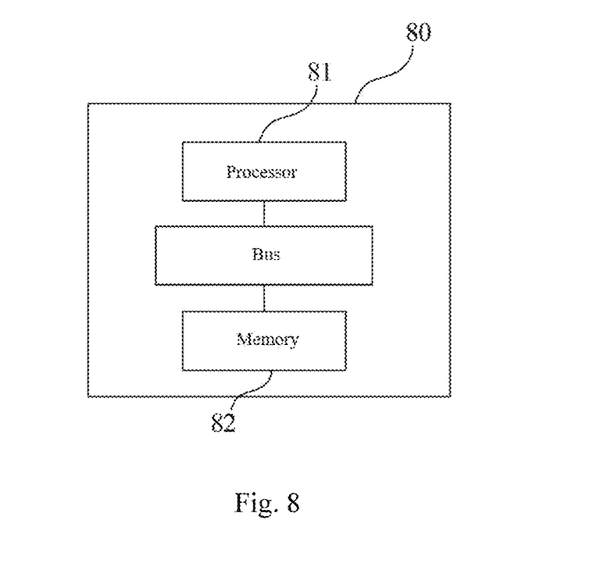
FIG. 8 is a schematic view of a device in accordance with another embodiment of the present disclosure.

FIG. 8 is a schematic view of a device in accordance with another embodiment of the present disclosure.

In one embodiment, the device 80 may include a processor 81 and a memory 82. The memory 82 is coupled to the processor 81 via, for example, a bus.

The memory 82 is configured to store at least one computer program. When the computer program is executed by the processor 81, it may implement the following method for extracting a face detection image.

The method includes the steps of obtaining a plurality of image frames; performing a face detection process on each image frame to extract a face area; performing a clarity analysis on the face area of each image frame to obtain a clarity degree of a face; conducting a posture analysis on the face area of each image frame to obtain a face posture angle; generating a comprehensive evaluation index for each image frame in accordance with the clarity degree of the face and the face posture angle of each image frame; selecting a key frame from a plurality of image frames based on the comprehensive evaluation index.

It should be noted that the device 80 in this embodiment is an entity processing based on the foregoing method embodiment, and its implementation principles and steps are similar, and will not be repeated here. Therefore, when the computer program is executed by the processor 81, it can also implement other method steps in the foregoing embodiment, which will not be repeated here.

Figure 9:
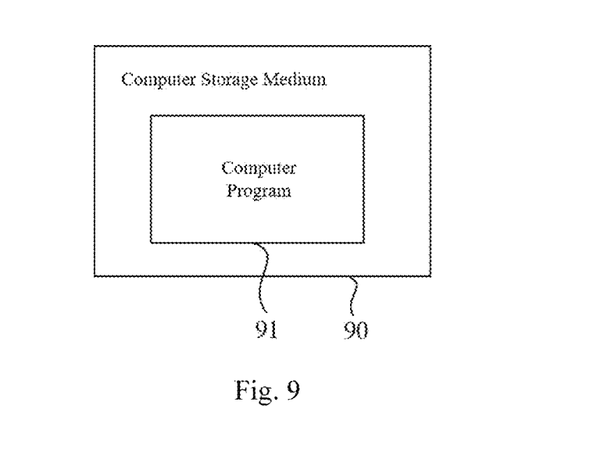
FIG. 9 is a schematic view of computer storage media in accordance with another embodiment of the present disclosure.

FIG. 9 is a schematic view of computer storage media in accordance with another embodiment of the present disclosure.

In one embodiment, the computer storage medium 90 is configured to store at least one computer program 91. When the computer program 91 is executed by a processor, it may implement the following method for extracting a face detection image.

The method includes the steps of obtaining a plurality of image frames; performing a face detection process on each image frame to extract a face area; performing a clarity analysis on the face area of each image frame to obtain a clarity degree of a face; conducting a posture analysis on the face area of each image frame to obtain a face posture angle; generating a comprehensive evaluation index for each image frame in accordance with the clarity degree of the face and the face posture angle of each image frame; selecting a key frame from a plurality of image frames based on the comprehensive evaluation index.

It should be noted that the computer program 91 in this embodiment is based on the foregoing method embodiment, and its implementation principles and steps are similar, and will not be repeated here. Therefore, when the computer program is executed by the computer program 91, it can also implement other method steps in the foregoing embodiment, which will not be repeated here.

When the embodiments of the present disclosure are implemented in the form of software functional units and sold or used as independent products, they can be stored in a computer readable storage medium. Based on this understanding, the technical solution of the present disclosure essentially or the part that contributes to the existing technology or all or part of the technical solution can be embodied in the form of a software product, and the computer software product is stored in a storage medium, including several instructions to make a computer device (which may be a personal computer, a server, or a network device, etc.) or a processor execute all or part of the steps of the methods described in the various embodiments of the present disclosure. The aforementioned storage media include flash memory, mobile hard disk, read-only memory (ROM), random access memory (RAM), disks or optical disks and other media that can store program codes.

The present disclosure can also have many other embodiments. Based on this embodiment, other embodiments obtained by those of ordinary skill in the art without any creative work are within the protection scope of the present disclosure.

What is claimed is:

1. A method for extracting a face detection image, comprising:
obtaining a plurality of image frames by an image detector;
performing a face detection process on each image frame to extract a face area;
performing a clarity analysis on the face area of each image frame to obtain a clarity degree of a face;
conducting a posture analysis on the face area of each image frame to obtain a face posture angle;
generating a comprehensive evaluation index for each image frame in accordance with the clarity degree of the face and the face posture angle of each image frame; and
selecting a key frame from the image frames based on the comprehensive evaluation index;
wherein the step of generating a comprehensive evaluation index for each image frame in accordance with the clarity degree of the face and the face posture angle of each image frame further comprises:
obtaining a maximum clarity degree of the face among the image frames;
obtaining a maximum face posture angle among the image frames; and
obtaining the comprehensive evaluation index for each image frame by performing a weighted summation of the ratio between the clarity degree of the face and the maximum clarity of the face and the ratio between the face posture angle and the maximum face posture angle.

2. The method of claim 1, wherein the step of performing a face detection process on each image frame further comprises:
extracting the face area having a greatest size when determining a plurality of the face areas are within the image frame.

3. The method of claim 1, wherein the step of performing a clarity analysis on the face area of each image frame further comprises:
obtaining a clarity evaluation graph by adopting a Laplacian operator to perform a convolution operation on the face area of each image frame; and
determining a variance of the clarity evaluation graph as the clarity degree of the face.

4. The method of claim 3, wherein before the step of obtaining a clarity evaluation graph by adopting a Laplacian operator to perform a convolution operation on the face area of each image frame, the method further comprises:
aligning the face area of each image frame through a similarity transformation process.

5. The method of claim 4, wherein the step of aligning the thee area of each image frame through a similarity transformation process further comprises:
configuring at least one specific organ point of the face as a key point; and
mapping each key point to a predetermined coordinate point of a predetermined coordinate plane.

6. The method of claim 3, wherein before adopting the Laplacian operator to perform the convolution operation on the face area of each image frame, further comprises:
conducting a smoothing process and a filtering process on the image frames to eliminate noise.

7. The method of claim 6, wherein before adopting the Laplacian operator to perform the convolution operation on the face area of each image frame, further comprises:
conducting a gray-scale process on the image frames after the smoothing process and the filter process.

8. The method of claim 1, wherein the step of conducting a posture analysis on the face area of each image frame further comprises:
obtaining a distance between eyes of the face in the face area as a first distance;
obtaining a distance between the eyes of the face and a mouth of the face as a second distance; and
obtaining a ratio of the first distance to the second distance as the face posture angle.

9. The method of claim 1. wherein the step of selecting a key frame from the image frames based on the comprehensive evaluation index further comprises:
selecting the image frame with a lamest comprehensive evaluation index as the key frame.

10. The method of claim 1, wherein after the step of selecting the key frame from the image frames based on the comprehensive evaluation index, the method further comprises:
submitting face image information in the key frame to a face registration database to perform a comparing process or a registering process.

11. The method of claim 10, wherein time information and location information of the key frame is stored in a background registry.

12. A device for extracting a face detection image, wherein the device comprising:
a memory;
a processor; and
one or more computer programs stored in the memory and executable on the processor, wherein the one or more computer programs comprise:
instructions for obtaining a plurality of image frames by an image detector;
instructions for performing a face detection process on each image frame to extract a face area;
instructions for performing a clarity analysis on the face area of each image frame to obtain a clarity degree of a face;
instructions for conducting a posture analysis on the face area of each image frame to obtain a face posture angle;
instructions for generating a comprehensive evaluation index for each image frame in accordance with the clarity degree of the face and the face posture angle of each image frame; and instructions for selecting a key frame from the image frames based on the comprehensive evaluation index;

wherein the instruction for performing a clarity analysis on the face area of each image frame further comprises:

instruction for obtaining a clarity evaluation graph by adopting a Laplacian operator to perform a convolution operation on the face area of each image frame; and instruction for determining aa variance of the clarity evaluation graph as the clarity degree of the face.

13. The device of claim 12, wherein the instruction for performing a face detection process on each image frame further comprises:

instruction for extracting the face area having a greatest size when determining a plurality of the face areas within the image frame.

14. The device of claim 12, wherein before the instruction for obtaining a clarity evaluation graph by adopting a Laplacian operator to perform a convolution operation on the face area of each image frame, the instruction further comprises:

instruction for aligning the face area of each image frame through a similarity transformation process.

15. The device of claim 14, wherein the instruction for aligning the face area of each image frame through a similarity transformation process further comprises:

instruction for configuring at least one specific organ point of the face as a key point; and instruction for mapping each key point to a predetermined coordinate point of a predetermined coordinate plane.

16. The device of claim 12, wherein the instruction for conducting a posture analysis on the face area of each image frame further comprises:

instruction for obtaining a distance between eyes of the face in the face area as a first distance;

instruction for obtaining a distance between the eyes of the face and a mouth of the face as a second distance; and instruction for obtaining a ratio of the first distance to the second distance as the thee posture angle.

17. The device of claim 12, wherein the instruction for generating a comprehensive evaluation index for each image frame in accordance with the clarity degree of the face and the face posture angle of each image frame further comprises:

instruction for obtaining a maximum clarity degree of the face among the image frames;

instruction for obtaining a maximum face posture angle among the image frames; and instruction for obtaining the comprehensive evaluation index for each image frame by instruction for performing a weighted summation of the ratio between the clarity degree of the face and the maximum clarity of the face of each image frame and the ratio between the face posture angle and the maximum face posture angle.

18. The device of claim 12, wherein the instruction for selecting a key frame from the image frames based on the comprehensive evaluation index further comprises:

instruction for selecting the image frame with a largest comprehensive evaluation index as the key frame.

19. The device of claim 12, wherein the one or more computer programs further comprise:

instructions for conducting a smoothing process and a filtering process on the image frames to eliminate noise.

20. The device of claim 12, wherein the one or more computer programs further comprise:

instructions for submitting face image information in the key frame to a face registration database to perform a comparing process or a registering process.

\* \* \* \* \*